United States Patent [19]
Murray

[11] Patent Number: 6,005,076
[45] Date of Patent: *Dec. 21, 1999

[54] OIL SEED PROTEIN EXTRACTION

[75] Inventor: Edward D. Murray, Eden Mills, Canada

[73] Assignee: B.M.W.Canola Inc., Winnipeg, Canada

[*] Notice: This patent is subject to a terminal disclaimer.

[21] Appl. No.: 08/930,389

[22] PCT Filed: Jan. 29, 1997

[86] PCT No.: PCT/CA97/00057

§ 371 Date: Dec. 16, 1997

§ 102(e) Date: Dec. 16, 1997

[87] PCT Pub. No.: WO97/27761

PCT Pub. Date: Aug. 7, 1997

Related U.S. Application Data

[63] Continuation-in-part of application No. 08/594,909, Jan. 31, 1996, Pat. No. 5,844,086.

[51] Int. Cl.[6] .............................. C07K 1/30; A23J 1/14; A23J 3/16
[52] U.S. Cl. .......................... 530/377; 530/378
[58] Field of Search .................. 530/377, 378, 530/414, 418, 419, 420, 422, 427

[56] References Cited

U.S. PATENT DOCUMENTS

| | | | |
|---|---|---|---|
| 4,208,323 | 6/1980 | Murray et al. | 426/656 |
| 4,285,862 | 8/1981 | Murray et al. | 426/656 |
| 4,366,097 | 12/1982 | Cameron et al. | 426/656 |
| 5,844,086 | 12/1998 | Murray | 530/377 |

FOREIGN PATENT DOCUMENTS

| | | |
|---|---|---|
| 289183 | 11/1988 | European Pat. Off. . |
| 55-25815 | 7/1980 | Japan . |

OTHER PUBLICATIONS

Database WPI Section C., Week 8031, Derwent Publications Ltd., London, GB, Class D13, AN 80–54624C XPO02029269 & JP 55 025 815 B (Takara Shuzo Co., Ltd.,) Jul. 9, 1980 See Abstract.

*Primary Examiner*—Jeffrey E. Russel
*Attorney, Agent, or Firm*—Sim & McBurney

[57] ABSTRACT

Protein isolates having a high protein content and low residual fat content are provided in substantially non-denatured form by extracting an oil seed meal having a significant fat content, particularly canola meal, with an aqueous food grade salt solution to cause solubilization of protein and fat in the oil seed meal and form an aqueous protein solution. Fat is removed from the aqueous protein solution by chilling the aqueous protein solution and removing the fat which separates. The protein concentration of the defatted protein solution is increased while the ionic strength is maintained substantially constant. A further fat removal operation may be carried out on the concentrated protein solution followed by dilution to an ionic strength below about 0.2 to cause the formation of discrete protein particles in the aqueous phase in the form of protein micelles. These protein micelles are settled to form a mass of aggregated protein isolate in the form of an amorphous, sticky gelatinous, gluten-like protein micellar mass, which is separated from the supernatant and dried to a proteinaceous powder.

51 Claims, 2 Drawing Sheets

OIL SEED PROTEIN EXTRACTION

REFERENCE TO RELATED APPLICATION

This application is a United States National Phase filing made under 35 USC 371 of PCT/CA97/00057 filed Jan. 29, 1997, which is a continuation-in-part of U.S. patent application Ser. No. 08/594,909 filed Jan. 31, 1996, now U.S. Pat. No. 5,844,086.

FIELD OF INVENTION

The present invention relates to the preparation and purification of proteinaceous materials from oil seeds and protein meals.

BACKGROUND TO THE INVENTION

Present day commercial oilseed processing techniques emphasize the production of bright, superdegummed oil and result in the removal from the oil of gums, soapstocks, bleaching clays and pigments, which are by-product materials and which are disposed of by adding them back to the meal resulting from crushing the oil seeds to remove the oil.

The addition of such materials to the oil seed meal results in a situation where it is not possible to extract protein isolates containing in excess of about 90% protein from such meals using environmentally sensitive isolation techniques. The fat present in the commercial meals normally results in concentration of the fat along with the protein in conventional processing techniques.

Protein levels which can be achieved with conventional processing techniques generally do not exceed about 70 to 75 wt % and their functionality in food systems is impaired by virtue of the interference of the fat. In addition, the presence of the fat in the dry protein product can lead to rancidity and other fat-related problems, including poor solubility, caking etc., as well as discoloration resulting from co-processing of pigments in the meal with the fat.

One emphasis of oil seed plant breeding program is towards improving the yield of oil from the oil seeds and indeed cultivars have been developed, for example, for canola (rapeseed) which are higher yielding in term of oil. However, such enhanced oil production has the effect of increasing the proportion of fat which is present in the oil seed meal as a result of the addition of the by-products from the oil refining to the oil seed meal.

While it is possible to at least partially remove such fats from the oil seed meals by extraction with organic solvents, the use of organic solvents, especially at elevated temperatures, tends to denature the protein, thereby impairing the functionality of the product, and, in addition, gives rise to a disposal and recovery problem that is not environmentally responsible.

In U.S. Pat. No. 4,208,323, of which I am an inventor, there is described a process for the isolation of proteins from various sources. The protein source materials which are employed in such process may come from a variety of sources, including oil seeds. The oil seed meals which were available in 1980, at the time of the issuance of the patent, did not have the fat contamination levels which are present in current oil seed meals and, as a consequence, the process that is described in the earlier patent, cannot produce from the present-day oil seed meals, proteinaceous material products which have the more than 90% protein content, which is a property of the proteinaceous materials produced by the process produced in the patent. It is necessary to employ a significant modification to such process to enable such products to be produced from present-day oil seed meals, including cold-pressed meals.

SUMMARY OF INVENTION

The present invention seeks to avoid this problem of the prior art by providing a process which is able to provide a purified protein isolation of high protein content from current fat-contaminated oil seed meal.

In accordance with the present invention, there is provided a process of preparing a protein isolate, which comprises (a) extracting an oil seed meal having a fat content up to about 10 wt % of the meal with an aqueous food grade salt solution having an ionic strength of at least about 0.2 and at a pH of about 5 to about 6.8 at a temperature of about 15° to about 75° C. to cause solubilization of proteinaceous material and some fat in the oil seed meal and to form a protein solution, (b) separating the protein solution from residual oil seed meal, which may be effected before or after step (c), (c) removing fat from the protein solution to provide a defatted protein solution, (d) increasing the protein concentration of the defatted protein solution while maintaining the ionic strength thereof substantially constant to form a concentrated defatted protein solution, (e) diluting the concentrated defatted protein solution to an ionic strength below about 0.2 to cause the formation of discrete protein particles in the aqueous phase in the form of highly aggregated microscopic protein micelles, (f) settling the protein micelles to form a mass of protein isolate at least partially in the form of an amorphous sticky gelatinous, gluten-like protein micellar mass, (g) separating the protein isolate from supernatant liquid, and (h) drying the separated protein isolate to provide a dried proteinaceous powder substantially undenatured and having a protein content of at least about 90 wt %.

In the present invention, it is necessary to effect the fat removal step or steps prior to the dilution step which produces the protein micelles, since otherwise the protein and fat copurify during the micelle formation step and then it is not possible to make a protein isolate of the required purity since the fat dilutes out the protein.

GENERAL DESCRIPTION OF INVENTION

Figure 1:
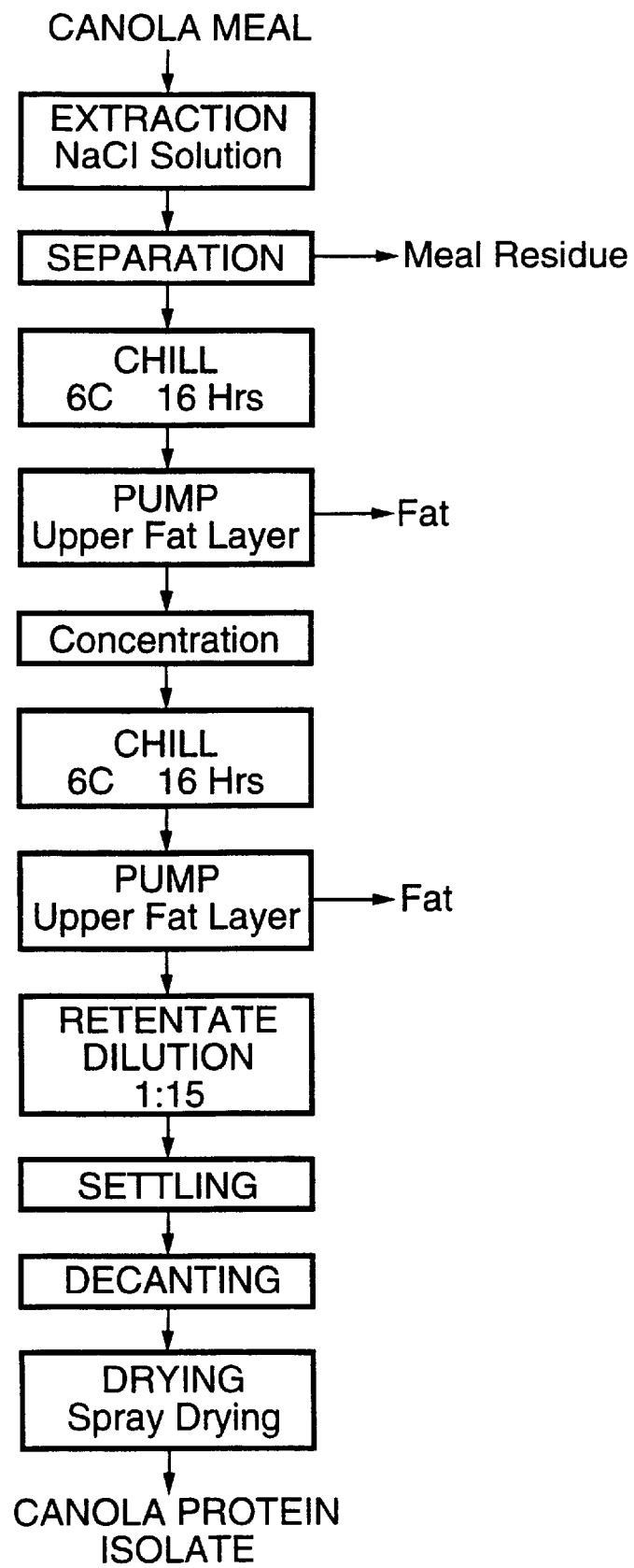
FIG. 1 is a schematic diagram of a protein isolation procedure according to one embodiment of the invention as applied to canola meal but also generally to other oil seed meals.
Figure 2:
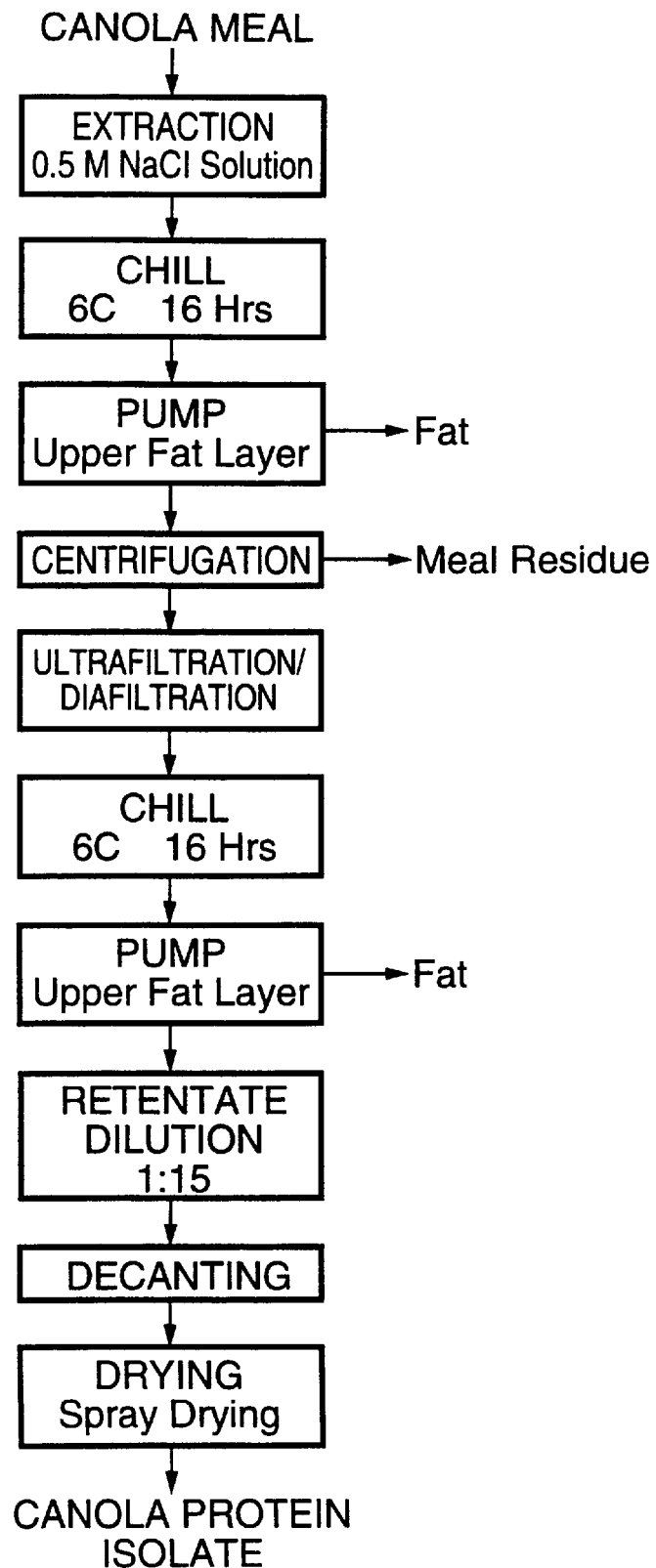
FIG. 2 is a schematic diagram of a protein isolation procedure according to another embodiment of the invention as applied to canola oil seed meal but also generally to other oil seed meals.

The steps involved in the process of the invention are shown in the form of the process flow sheets of FIGS. 1 and 2.

The initial step of the process of this invention involves solubilizing proteinaceous material from oil seed meal, particularly canola meal, although the process may be applied to other oil seed meals, such as soybean meal and rapeseed meal. Such proteinaceous material may be the proteins naturally occurring in Canola seed or other oil seed or the proteinaceous material may be proteins introduced by genetic manipulation but possessing characteristic hydrophobic and polar properties of the proteins. The canola meal may be any canola meal resulting from the removal of canola oil from canola seed with varying levels of non-denatured protein, resulting, for example, from hot hexane extraction or cold oil extrusion methods. As discussed above, such oil seed meal contains a significant proportion of fat, up to about 10 wt % of the meal.

A food grade salt solution is used in the protein solubilization, and the food grade salt usually is sodium chloride, although other salts, such as, potassium chloride, may be used. The food grade salt solution has an ionic strength of at least about 0.2 to enable solubilization of significant quantities of protein to be effected. As the ionic strength of the salt solution increases, the degree of solubilization of protein in the source material initially increases until a maximum value is achieved. Any subsequent increase in ionic strength does not increase the total protein solubilized. The ionic strength of the food grade salt solution which causes maximum protein solubilization varies depending on the salt concerned and the protein source chosen.

In view of the greater degree of dilution required for protein precipitation with increasing ionic strengths, it is usually preferred to utilize an ionic strength value less than about 0.8, and more preferably a value of about 0.3 to about 0.6. Ionic strength values up to 5.0, however, have been used. In the illustrated embodiment in FIGS. 1 and 2 an 0.5 M NaCl solution is used to solubilize protein in the canola meal.

The salt solubilization of the protein is effected at a temperature of about 5 to about 35° C., preferably accompanied by agitation to decrease the solubilization time, which is usually about 10 to about 60 minutes. It is preferred to effect the solubilization to extract substantially the maximum amount of protein from the source material.

The lower temperature limit of about 5° C. is chosen since solubilization is impractically slow below this temperature while the upper temperature limit of about 35° C. is chosen since microbial growth becomes unacceptably rapid above this temperature.

The aqueous food grade salt solution and the oil seed meal have a natural pH of about 5 to about 6.8 to enable the protein isolate to be formed by the micellar route, as described in more detail below. The optimum pH value for maximum yield of protein isolate varies depending on the protein source material chosen.

At and close to the limits of the pH range, protein isolate formation occurs only partly through the micelle route and in lower yields than attainable elsewhere in the pH range. For these reasons, pH values of about 5.3 to 6.2 are preferred.

The pH of the food grade salt solution may be adjusted to any desired value within the range of about 5 to about 6.8 for use in the extraction step by the use of any convenient food grade acid, usually hydrochloric acid, or food grade alkali, usually sodium hydroxide, as required.

The concentration of protein source material in the food grade salt solution during the solubilization step may vary widely. Typical concentration values are about 5 to about 15% w/v.

The protein extraction step with the aqueous salt solution has the additional effect of solubilizing certain fats in the canola meal, which results in the fats being present in the aqueous phase.

The protein solution generally has a protein concentration of about 10 to about 100 g/l, preferably about 30 to about 70 g/l, along with about 1 to about 10 g/l of solubilized fat. The protein solution may be sampled for fat content by standard total fat testing methods.

As seen in FIG. 1, the total aqueous phase resulting from the extraction step then may be separated from the residual canola meal, in any convenient manner, such as by employing a bladder press, followed by centrifugation to remove residual meal. The separated meal residue may be dried for disposal. Alternatively, the meal residue may be separated following the first fat removal step described below, as illustrated in the embodiment of FIG. 2.

The protein solution then is subjected to a defatting operation, to remove at least a proportion of the fat therefrom. The defatting operation may be effected by chilling the aqueous protein solution to a temperature below about 15° C., preferably below about 10° C. and particularly in the range of about 3° to about 7° C., generally without agitation, to cause fat to separate from the aqueous phase for removal by any convenient separation operation, such as by decanting, centrifugation and/or fine filtration, for example, using a 5 μm GAF bag filter. The chilled protein solution may be sampled for fat content to determine fat removed by chilling. In the illustrated embodiments, the fat is decanted from the surface of the solution, such as by the use of a pump, and the defatted solution may be fine filtered to remove residual precipitated fat, as seen in FIG. 1. Alternatively, in the embodiment of FIG. 2, the separation of residual meal may be effected following the chilling step by centrifugation of the defatted protein solution.

The defatting operation generally is effected to remove about 30 to about 90%, preferably about 70 to about 90%, of the fat contained in the aqueous protein solution and enables the defatted protein solution to be further processed to produce a protein isolate having a high protein content.

The defatted aqueous protein solution then is concentrated to increase the protein concentration thereof while maintaining the ionic strength thereof substantially constant.

The concentration step may be effected by any convenient selective membrane technique, such as, ultrafiltration or diafiltration. The concentration step has the beneficial effect of increasing the yield of protein micellar isolate which may be obtained from the process, and thereby increasing the overall efficiency of the protein isolation process.

The degree of concentration of the protein solution can be termed the "volume reduction factor". As the volume reduction factor, expressed as the ratio of the volume of the solution prior to concentration to the volume of concentrated solution, and hence the protein concentration increases from 1.0, the attainable yield increases until a maximum is reached.

Once the maximum attainable yield is reached, further decreases in volume of concentrated solution are beneficial only with respect to the volume of liquid required for subsequent dilution during the protein isolation step.

The volume reduction factor at which the maximum attainable yield is reached is dependent on the protein source material concerned and the pH of the protein solution. It is preferred to use a volume reduction factor of about 3.0 to about 10, since the maximum attainable yield frequently results from the use of these values. A volume reduction factor of at least about 1.1 usually is used and as the volume reduction factors become quite high the viscosity of the protein solution becomes quite high, which may lead to difficulties in processing, thereby inhibiting the utilization of greater values.

The concentration may be effected at any convenient temperature, typically about 20° to about 45° C., and for the period of time to effect the desired degree of concentration. The temperature and other conditions used to some degree depend upon the membrane equipment used to effect the concentration and the protein concentration of the solution.

The concentrating of the protein solution in this step not only increases the overall process yield but also decreases the salt concentration of the final protein isolate after drying. The ability to control the salt concentration of the isolate is important in applications of the isolate where variations in salt concentrations affect the functional and sensory properties in a specific food application.

As is well known, ultrafiltration and similar selective membrane techniques permit low molecular weight species to pass therethrough while preventing higher molecular weight species from so doing. The low molecular weight species include not only the ionic species of the food grade salt but also low molecular weight materials extracted from the source material, such as, carbohydrates, pigments etc. The molecular weight cut-off of the membrane is usually chosen to ensure retention of substantially all of the proteins in the solution.

The elimination of low molecular weight species from the extracted solution during the concentration step permits the protein concentration to be increased without precipitation thereof, well beyond the maximum concentration attainable during the extraction step.

The concentrated protein solution may be subjected to a further fat removal step by chilling the concentrated protein solution to a temperature below about 15° C., preferably below about 10° C., particularly within the range of about 3° to about 7° C., to cause fat to separate from the aqueous phase and removing the fat separating from the concentrated protein solution. Any of the fat separation procedures described above for the first defatting step may be used, alone or in combination, for the removal of the fat from the chilled concentrated protein solution. The further defatting operation results generally in the removal of about 30 to about 90% of the residual fat, preferably about 70 to about 90%, to a residual fat concentration of about 1 to about 10 g/l of concentrated protein solution.

The protein solution may be sampled for fat content to determine fat removed by chilling. The fat is decanted from the surface of the solution, such as by the use of a pump, and the defatted solution is fine filtered to remove residual precipitated fat.

The concentrated protein solution resulting from the concentration and defatting steps, generally having a protein concentration of about 40 to about 200 g/l, depending on the initial protein concentration and the volume reduction factor used, is diluted to an ionic strength of less than about 0.2, generally by adding the concentrated protein solution into a body of water having the volume required to achieve the required ionic strength decrease.

The body of water into which the concentrated protein solution is fed usually has a temperature less than about 25° C., and preferably has a temperature of about 3° to about 15° C., since improved yields of protein isolate are attained with these colder temperatures.

The decrease in ionic strength causes the formation of a cloud-like mass of highly aggregated protein molecules in discrete protein droplets in micellar form. The protein micelles are allowed to settle to form an aggregated, coalesced dense amorphous sticky gluten-like protein isolate mass. The settling may be assisted, such as by centrifugation. Such induced settling decreases the liquid content of the protein isolate mass, thereby decreasing the moisture content generally from about 70% by weight to about 95% by weight to a value of generally about 50% by weight to about 80% by weight of the total isolate mass. Decreasing the moisture content of the isolate mass in this way also decreases the occluded salt content of the isolate, and hence the salt content of dried isolate.

The ionic strength to which the concentrated protein solution is diluted below about 0.2 affects the efficiency of micellization and hence the yield of isolate which is attained. For this reason, the ionic strength usually is decreased to a value less than about 0.15 and preferably less than about 0.1. The ability to attain good yields of protein isolate in the ionic strength range of about 0.1 to about 0.2 in this invention contrasts markedly with the above-mentioned prior art procedure where the ionic strength must be decreased below 0.1 to achieve reasonable yields.

The dilution is preferably effected to an ionic strength in the range of about 0.06 to about 0.12, since optimum yields are attainable in this range, and excessive volumes of water for no additional benefit are required for an ionic strength below about 0.06. The lower limit of ionic strength for the diluted protein solution is dictated more by practical economic considerations of liquor volume than by process operability considerations. In the illustrated embodiment, the concentrated protein solution is diluted in about 1:15 water.

The settled isolate, in the form of an amorphous, aggregated, sticky, gelatinous, gluten-like protein mass, termed "protein micellar mass", or PMM, is separated from the residual aqueous phase, such as by decantation of the residual aqueous phase from the settled mass. The PMM may be used in the wet form or may be dried, by any convenient technique, such as spray drying, freeze drying or vacuum drum drying, to a dry form. The dry PMM has a high protein content, usually in excess of about 90% protein (calculated as kjeldahl N×6.25), and is substantially undenatured (as determined by differential scanning calorimetry). The dry PMM isolated from the fatty oil seed meal also has a low residual fat content, which may be below about 1%.

The ability to achieve high levels of undenatured protein contrasts markedly with the protein levels achieved by conventional techniques. The high undenatured protein content which is achieved by the application of the process of the invention to present day fatted oil seed meals is comparable to that achievable by the process of U.S. Pat. No. 4,208,323 for protein source materials as described in the patent.

The unique defatting operations which are carried out as described above in accordance with the invention enable the high protein level to be achieved in a non-denaturing process from oil seed meal contaminated with fat. The procedure of the invention enables there to be provided a modified protein micellular mass liquid exclusion product, herein termed MPMMLE.

The invention is illustrated by the following Examples:

EXAMPLE 1

This Example illustrates the preparation of a protein isolate from canola oil seed meal according to one embodiment of the invention according to the procedure of FIG. 1.

Commercial canola meal (50 kg) was added to 500 liters of an aqueous solution of sodium chloride (0.5 M) made from tap water, all contained in a 600 liter system. The mixture was stirred for 4 hours at 8° C. with agitation at 76.0 rpm with a paddle type mixer. The entire mixture was then subjected to a pressing step with a Wilmes type bladder press. The liquid recovered from the press was then centrifuged in a Westphalia clarifier which produced a crude salt/protein extract of 13 mg protein/ml extract and a final total volume of 477 liters.

The crude salt/protein solution was then chilled to 6° C. for 16 hours, after which time a fat layer had risen to the top of the solution. This upper layer was pumped off and the remaining proteinaceous solution was filtered through a bag-type filter with a rated porosity of 5 microns to remove remaining particles of hull and cell wall material plus residual particles of fat.

The clarified solution was concentrated in a hollow fiber ultrafiltration system with a molecular weight cut-off of 30,000 to a final volume of 50 liters with a protein concentration of approximately 120 mg/ml. The resulting 50 liter concentrate was again chilled to 6° C. for 16 hours and a small fat film formed at the surface of the solution, this film was skimmed off and discarded.

The high protein liquid extract was diluted 15 fold in tap water (6° C.). Immediately upon dilution, a white cloud was seen to form. Without agitation, this proteinaceous cloud (caused by protein aggregation due to hydrophobic association of the canola meal proteins) was allowed to settle in the dilution vessel. The upper diluting water was pumped off and the precipitated, viscous protein mass was collected and spray dried. The resulting protein isolate (91% protein, as is) was shown by differential scanning calorimetry to be native with high functionality in different food applications. The final fat level of the isolate was 0.93%.

EXAMPLE 2

This Example illustrates the preparation of a protein isolate from solvent extracted rapeseed meal in accordance with a further embodiment of the invention using the procedure of FIG. 2.

Meal from a commercial Polish rapeseed containing 32.5% protein (as is), 10.1% fat and 6.1% moisture was extracted at the 10% w/v ratio in water containing 1.46 wt % salt. The extraction system was mixed for 2 hours at 25° C., processed as described in Example 1 to remove residual meal and then chilled to 8° C. and allowed to settle for 1 hour. After this settling period, approximately 200 g of fat were skimmed from the top of the settling system, the aqueous system was then centrifuged to remove particulate material. The supernatant was diafiltered and then concentrated on a membrane with a molecular weight cut-off rated at 30,000 daltons. This combined membrane step required 4.5 hours and produced a protein extract with a total solids level of 4.1% (43.9% protein, dry basis). The protein extract was diluted 15 fold in cold tap water (2° C.), a white micelle cloud of aggregated protein formed immediately upon dilution. This micellar mass was allowed to settle for 14 hours at 3° C., the upper diluting water was decanted and the viscous protein mass was collected from the bottom and dried to form the final proteinaceous product.

EXAMPLE 3

This Example illustrates the use of a meal prepared from the cold pressing (extrusion) of canola seeds.

Intact canola seeds were fed into and crushed within a cold extrusion press (Monforts type), the resulting plugs were crushed, compacted seed debris (less the extruded oil) were ground in a standard mill (Fitz type) to give a consistency similar to that of commercial canola meal. This material was then processed by the protein extraction and recovery process as described in Example 2. The typical cloud of protein micelles formed upon dilution and the viscous micellar mass was collected and dried to form the final proteinaceous product.

EXAMPLE 4

This Example illustrates the application of the procedure of the present invention to commercial soybean meal.

The commercial soybean meal (10 kg) from a cold crushing facility using no organic solvents containing 46% protein was extracted in 0.35 M sodium chloride at pH 6.5 with 30 minutes of agitation. The starting meal contained 6.0% fat. All procedures as outlined in FIG. 2 and described in detail in Example 2 were followed for this soy material, including the chilling steps to remove fat from the aqueous phases, except the dilution ratio was adjusted to 1:3.5. Upon dilution of the high protein retentate into cold tap water a white proteinaceous cloud formed immediately. The protein micelles settled with centrifugation and the viscous protein mass was collected from the bottom of the dilution vessel and dried to form the final proteinaceous product.

SUMMARY OF DISCLOSURE

In summary of this disclosure, the present invention provides a novel procedure for forming a protein isolate of high protein content from a fatted oil seed meal in a gentle non-denaturing process in which fat is substantially removed. Modifications are possible within the scope of the invention.

What I claim is:

1. A process of preparing a protein isolate, which comprises:
    (a) extracting an oil seed meal which is rapeseed meal or soybean meal having a fat content up to about 10 wt % of the meal with an aqueous food grade salt solution having an ionic strength of at least about 0.2 and at a pH of about 5 to about 6.8 at a temperature of about 5° to about 35° C. to cause solubilization of protein and fat in said oil seed meal and form an aqueous protein solution,
    (b) separating the aqueous protein solution from residual oil seed meal,
    (c) removing fat from the aqueous protein solution to provide a defatted protein solution,
    (d) increasing the protein concentration of said defatted protein solution while maintaining the ionic strength thereof substantially constant to form a concentrated defatted protein solution,
    (e) diluting the concentrated defatted protein solution to an ionic strength below about 0.2 to cause the formation of discrete protein particles in the aqueous phase at least partially in the form of protein micelles,
    (f) settling the protein micelles to form a mass of protein isolate at least partially in the form of an amorphous sticky gelatinous, gluten-like protein micellar mass,
    (g) separating the protein isolate from supernatant liquid, and
    (h) drying the separated protein isolate to provide a dried proteinaceous powder substantially undenatured and having a protein content of at least about 90 wt %.

2. The process of claim 1 wherein said aqueous food grade salt solution has an ionic strength of about 0.3 to about 0.6.

3. The process of claim 1 wherein said extracting step is effected for about 10 to about 60 minutes.

4. The process of claim 2 wherein said aqueous food grade salt solution has a pH of about 5.3 to about 6.2.

5. The process of claim 1 wherein said aqueous protein solution has a concentration of about 10 to about 100 g/l of protein and about 1 to about 10 g/l of solubilized fat.

6. The process of claim 5 wherein fat is removed from the aqueous protein solution by chilling the aqueous protein solution to cause fat to separate from the aqueous phase and then separating the fat from the aqueous phase.

7. The process of claim 6 wherein said fat is separated by decanting, centrifugation and/or fine filtration.

8. A process of preparing a protein isolate, which comprises:
   (a) extracting an oil seed meal having a fat content up to about 10 wt % of the meal with an aqueous food grade salt solution having an ionic strength of at least about 0.2 and at a pH of about 5 to about 6.8 at a temperature of about 5° about 35° C. to cause solubilization of protein and fat in said oil seed meal and form an aqueous protein solution,
   (b) separating the aqueous protein solution from residual oil seed meal,
   (c) removing fat from the aqueous protein solution by chilling said aqueous protein solution to a temperature below about 15° C. to cause fat to separate from the aqueous phase and to effect removal of about 30 to about 90% of the fat from said aqueous protein solution and separating the fat from the aqueous phase to provide a defatted protein solution,
   (d) increasing the protein concentration of said defatted protein solution while maintaining the ionic strength thereof substantially constant to form a concentrated defatted protein solution,
   (e) diluting the concentrated defatted protein solution to an ionic strength below about 0.2 to cause the formation of discrete protein particles in the aqueous phase at least partially in the form of protein micelles,
   (f) settling the protein micelles to form a mass of protein isolate at least partially in the form of an amorphous sticky gelatinous, gluten-like protein micellar mass,
   (g) separating the protein isolate from supernatant liquid, and
   (h) drying the separated protein isolate to provide a dried proteinaceous powder substantially undenatured and having a protein content of at least about 90 wt %.

9. The process of claim 8 wherein said aqueous protein solution is chilled to about 3° to about 7° C.

10. The process of claim 9 wherein about 70 to about 90% of the fat content of the aqueous protein solution is removed.

11. A process of preparing a protein isolate, which comprises:
   (a) extracting an oil seed meal having a fat content up to about 10 wt % of the meal with an aqueous food grade salt solution having an ionic strength of at least about 0.2 and at a pH of about 5 to about 6.8 at a temperature of about 5° C. to about 35° C. to cause solubilization of protein and fat in said oil seed meal and form an aqueous protein solution,
   (b) removing fat from the aqueous protein solution by chilling the aqueous solution to cause fat to separate from the aqueous phase and then separating the fat from the aqueous phase and to provide a defatted protein solution,
   (c) separating said residual oil seed meal from the defatted protein solution following the separation of fat from the aqueous phase,
   (d) increasing the protein concentration of said defatted protein solution while maintaining the ionic strength thereof substantially constant to form a concentrated defatted protein solution,
   (e) diluting the concentrated defatted protein solution to an ionic strength below about 0.2 to cause the formation of discrete protein particles in the aqueous phase at least partially in the form of protein micelles,
   (f) settling the protein micelles to form a mass of protein isolate at least partially in the form of an amorphous sticky gelatinous, gluten-like protein micellar mass,
   (g) separating the protein isolate from supernatant liquid, and
   (h) drying the separated protein isolate to provide a dried proteinaceous powder substantially undenatured and having a protein content of at least about 90 wt %.

12. A process of preparing a protein isolate, which comprises:
   (a) extracting an oil seed meal having a fat content up to about 10 wt % of the meal with an aqueous food grade salt solution having an ionic strength of at least about 0.2 and at a pH of about 5 to about 6.8 at a temperature of about 5° about 35° C. to cause solubilization of protein and fat in said oil seed meal and form an aqueous protein solution,
   (b) separating the aqueous protein solution from residual oil seed meal,
   (c) following the separation of the aqueous protein solution from the residual oil seed meal, removing fat from the aqueous protein solution by chilling the aqueous protein solution to cause fat to separate from the aqueous phase and then separating the fat from the aqueous phase to provide a defatted protein solution.
   (d) increasing the protein concentration of said defatted protein solution while maintaining the ionic strength thereof substantially constant to form a concentrated defatted protein solution,
   (e) diluting the concentrated defatted protein solution to an ionic strength below about 0.2 to cause the formation of discrete protein particles in the aqueous phase at least partially in the form of protein micelles,
   (f) settling the protein micelles to form a mass of protein isolate at least partially in the form of an amorphous sticky gelatinous, gluten-like protein micellar mass,
   (g) separating the protein isolate from supernatant liquid, and
   (h) drying the separated protein isolate to provide a dried proteinaceous powder substantially undenatured and having a protein content of at least about 90 wt %.

13. The process of claim 1 wherein the defatted protein solution is concentrated while maintaining the ionic strength thereof by using a selective membrane technique.

14. The process of claim 13 wherein the defatted protein solution is concentrated by a volume reduction factor of about 3.0 to about 10.

15. The process of claim 14 wherein said concentration is effected at a temperature of about 20° C. to about 45° C.

16. The process of claim 1 wherein the concentrated defatted protein solution is subjected to a further fat removal step prior to said dilution step.

17. The process of claim 16 wherein said further fat removal step is effected by chilling the concentrated defatted protein solution to cause fat to separate from the aqueous solution and then separating the fat from the aqueous phase.

18. The process of claim 17 wherein the fat is separated by decanting, centrifugation and/or fine filtration.

19. A process of preparing a protein isolate, which comprises:

(a) extracting an oil seed meal having a fat content up to about 10 wt % of the meal with an aqueous food grade salt solution having an ionic strength of at least about 0.2 and at a pH of about 5 to about 6.8 at a temperature of about 5 to about 35 C to cause solubilization of protein and fat in said oil seed meal and form an aqueous protein solution, (b) separating the aqueous protein solution from residual oil seed meal, (c) removing fat from the aqueous protein solution to provide a defatted protein solution, (d) increasing the protein concentration of said defatted protein solution while maintaining the ionic strength thereof substantially constant to form a concentrated defatted protein solution, (e) a subjecting the concentrated defatted protein solution to a further fat removal step by chilling said concentrated defatted protein solution to a temperature below about 15° C. to effect removal of about 30 to about 90% of the fat from said concentrated defatted protein solution, and then separating the fat from the aqueous phase to provide a concentrated further defatted protein solution, (f) diluting the concentrated further defatted protein solution to an ionic strength below about 0.2 to cause the formation of discrete protein particles in the aqueous phase at least partially in the form of protein micelles, (g) settling the protein micelles to form a mass of protein isolate at least partially in the form of an amorphous sticky gelatinous, gluten-like protein micellar mass, (h) separating the protein isolate from supernatant liquid, and (i) drying the separated protein isolate to provide a dried proteinaceous powder substantially undenatured and having a protein content of at least about 90 wt %.

20. The process of claim 19 wherein said concentrated defatted protein solution is chilled to about 3° to about 7° C.

21. The process of claim 20 wherein about 70 to about 90% of the fat content of the concentrated defatted protein solution is removed.

22. A process of preparing a protein isolate, which comprises:

(a) extracting an oil seed meal having a fat content up to about 10 wt % of the meal with an aqueous food grade salt solution having an ionic strength of at least about 0.2 and at a pH of about 5 to about 6.8 at a temperature of about 5° to about 35° C. to cause solubilization of protein and fat in said oil seed meal and form an aqueous protein solution, (b) separating the aqueous protein solution from residual oil seed meal, (c) removing fat from the aqueous protein solution to provide a defatted protein solution, (d) increasing the protein concentration of said defatted protein solution while maintaining the ionic strength thereof substantially constant to form a concentrated defatted protein solution, (e) diluting the concentrated defatted protein solution at a temperature of less than about 25° C. to an ionic strength below about 0.2 to cause the formation of discrete protein particles in the aqueous phase at least partially in the form of protein micelles, (f) settling the protein micelles to form a mass of protein isolate at least partially in the form of an amorphous sticky gelatinous, gluten-like protein micellar mass, (g) separating the protein isolate from supernatant liquid, and (h) drying the separated protein isolate to provide a dried proteinaceous powder substantially undenatured and having a protein content of at least about 90 wt %.

23. The process of claim 22 wherein the dilution step is effected by feeding the concentrated defatted protein solution into a chilled body of water having a temperature of about 3 to about 15° C.

24. The process of claim 22 wherein said dilution is effected to an ionic strength of about 0.06 to about 0.12.

25. The process of claim 24 wherein said protein micelles are settled by centrifugation.

26. The process of claim 22 wherein said oil seed meal is canola meal.

27. The process of claim 11 wherein said fat is separated by decanting, centrifugation and/or fine filtration.

28. The process of claim 11 wherein said aqueous protein solution is chilled to a temperature below about 15° C. to effect removal of about 30 to about 90% fat from said aqueous protein solution.

29. The process of claim 11 wherein said aqueous protein solution is chilled to about 3° to about 7° C.

30. The process of claim 29 wherein about 70 to about 90% of the fat content of the aqueous protein solution is removed.

31. The process of claim 11 wherein said oil seed meal is canola meal.

32. The process of claim 22 wherein said aqueous food grade salt solution has an ionic strength of about 0.3 to about 0.6.

33. The process of claim 22 wherein said extracting step is effected for about 10 to about 60 minutes.

34. The process of claim 32 wherein said aqueous food grade salt solution has a pH of about 5.3 to about 6.2.

35. The process of claim 22 wherein said aqueous protein solution has a concentration of about 10 to about 100 g/l of protein and about 1 to about 10 g/l of solubilized fat.

36. The process of claim 35 wherein fat is removed from the aqueous protein solution by chilling the aqueous protein solution to cause fat to separate from the aqueous phase and then separating the fat from the aqueous phase.

37. The process of claim 36 wherein said fat is separated by decanting, centrifugation and/or fine filtration.

38. The process of claim 36 wherein said aqueous protein solution is chilled to a temperature below about 15° C. to effect removal of about 30 to about 90% fat from said aqueous protein solution.

39. The process of claim 36 wherein said aqueous protein solution is chilled to about 3° to about 7° C.

40. The process of claim 39 wherein about 70 to about 90% of the fat content of the aqueous protein solution is removed.

41. The process of claim 36 wherein said chilling step is effected on the aqueous protein solution prior to said separation from residual oil seed meal and said residual oil seed meal is separated from the aqueous protein solution following the separation of fat from the aqueous phase.

42. The process of claim 36 wherein said chilling step is effected on the aqueous protein solution following the separation of the aqueous protein solution from residual oil seed meal.

43. The process of claim 22 wherein the defatted protein solution is concentrated while maintaining the ionic strength thereof by using a selective membrane technique.

44. The process of claim 43 wherein the defatted protein solution is concentrated by a volume reduction factor of about 3.0 to about 10.

45. The process of claim 44 wherein said concentration is effected at a temperature of about 20° C. to about 45° C.

46. The process of claim 22 wherein the concentrated defatted protein solution is subjected to a further fat removal step prior to said dilution step.

47. The process of claim 46 wherein said further fat removal step is effected by chilling the concentrated defatted protein solution to cause fat to separate from the aqueous solution and then separating the fat from the aqueous phase.

48. The process of claim 47 wherein the fat is separated by decanting, centrifugation and/or fine filtration.

49. The process of claim 47 wherein said concentrated defatted protein solution is chilled to a temperature below about 15° C. to effect removal of about 30 to about 90% of the fat from said aqueous protein solution.

50. The process of claim 47 wherein said concentrated defatted protein solution is chilled to about 3° to about 7° C.

51. The process of claim 50 wherein about 70 to about 90% of the fat content of the concentrated defatted protein solution is removed.

* * * * *